(12) United States Patent
Ryu et al.

(10) Patent No.: US 9,649,940 B2
(45) Date of Patent: May 16, 2017

(54) DEVICE AND METHOD FOR CONTROLLING ELECTRIC VEHICLE

(75) Inventors: Kihwan Ryu, Yongin-Si (KR); Mingyu Kang, Yongin-Si (KR)

(73) Assignee: LG ELECTRONICS INC., Seoul (KR)

(*) Notice: Subject to any disclaimer, the term of this patent is extended or adjusted under 35 U.S.C. 154(b) by 62 days.

(21) Appl. No.: 14/367,315

(22) PCT Filed: Jul. 9, 2012

(86) PCT No.: PCT/KR2012/005411
§ 371 (c)(1),
(2), (4) Date: Jun. 20, 2014

(87) PCT Pub. No.: WO2013/100293
PCT Pub. Date: Jul. 4, 2013

(65) Prior Publication Data
US 2015/0291036 A1    Oct. 15, 2015

(30) Foreign Application Priority Data

Dec. 26, 2011 (KR) .......................... 10-2011-0142665

(51) Int. Cl.
*B60K 35/00* (2006.01)
*B60L 3/12* (2006.01)
(Continued)

(52) U.S. Cl.
CPC .............. *B60L 3/12* (2013.01); *B60K 35/00* (2013.01); *B60L 1/00* (2013.01); *B60L 1/003* (2013.01);
(Continued)

(58) Field of Classification Search
CPC .......... B60L 3/12; B60L 1/02; B60L 11/1866; B60L 11/14; B60L 1/003; B60L 1/00;
(Continued)

(56) References Cited

U.S. PATENT DOCUMENTS

2007/0170778 A1* 7/2007 Yamaguchi .............. B60K 1/00
                                                                    307/10.1
2012/0143410 A1* 6/2012 Gallagher ........... B60L 11/1861
                                                                    701/22

FOREIGN PATENT DOCUMENTS

JP         2004-254483 A      9/2004
JP         2009-171647 A      7/2009
(Continued)

OTHER PUBLICATIONS

Machine translation of JP 2010-226795, printed Dec. 8, 2015.*
(Continued)

*Primary Examiner* — Redhwan K Mawari
*Assistant Examiner* — Alan D Hutchinson
(74) *Attorney, Agent, or Firm* — KED & Associates, LLP (57) ABSTRACT

The present invention relates to a device and method for controlling an electric vehicle that enables a user to easily control a predicted distance that can be travelled by displaying the predicted distance that can be travelled in response to the power consumption of electric loads on the electric vehicle. The device for controlling the electric vehicle according to an embodiment of the present invention may include: a power consumption detector that detects a first power consumption of main electric loads associated with the operation of the electric vehicle and a second power consumption of optional electric loads on the electric vehicle; a control unit that determines a first predicted distance that can be travelled corresponding to the first power consumption detected and a second predicted distance that can be travelled corresponding to the second power consumption detected; and a display that displays the first and second predicted distances that can be travelled.

18 Claims, 9 Drawing Sheets

(51) Int. Cl.
*G01C 22/00* (2006.01)
*B60L 1/00* (2006.01)
*B60L 11/18* (2006.01)
*B60L 1/02* (2006.01)
*B60L 11/14* (2006.01)
*G01C 21/34* (2006.01)

(52) U.S. Cl.
CPC ................ *B60L 1/02* (2013.01); *B60L 11/14* (2013.01); *B60L 11/1861* (2013.01); *B60L 11/1866* (2013.01); *G01C 22/00* (2013.01); B60K 2350/106 (2013.01); B60K 2350/1096 (2013.01); B60L 2210/40 (2013.01); B60L 2240/12 (2013.01); B60L 2240/34 (2013.01); B60L 2240/36 (2013.01); B60L 2240/547 (2013.01); B60L 2240/622 (2013.01); B60L 2250/12 (2013.01); B60L 2250/16 (2013.01); B60L 2260/52 (2013.01); B60L 2260/54 (2013.01); G01C 21/3469 (2013.01); *Y02T 10/70* (2013.01); *Y02T 10/7005* (2013.01); *Y02T 10/7044* (2013.01); *Y02T 10/7061* (2013.01); *Y02T 10/7077* (2013.01); *Y02T 10/7241* (2013.01); *Y02T 10/7291* (2013.01); *Y02T 10/84* (2013.01); *Y02T 90/16* (2013.01); *Y02T 90/161* (2013.01); *Y02T 90/162* (2013.01)

(58) Field of Classification Search
CPC ................ B60L 11/1861; B60K 35/00; B60K 2350/1096; B60K 2350/106; G01C 22/00; Y02T 10/7291; Y02T 10/70; Y02T 10/7044; Y02T 10/7005; Y02T 90/16; Y02T 10/707
See application file for complete search history.

(56) References Cited

FOREIGN PATENT DOCUMENTS

| | | |
|---|---|---|
| JP | 2010-226795 A | 10/2010 |
| JP | 2011-244652 A | 12/2011 |

OTHER PUBLICATIONS

Machine translation of JP 2011-244652, printed Dec. 8, 2015.*
International Search Report and Written Opinion dated Dec. 27, 2012 issued in International Application No. PCT/KR2012/005411.

* cited by examiner

DEVICE AND METHOD FOR CONTROLLING ELECTRIC VEHICLE

CROSS-REFERENCE TO RELATED PATENT APPLICTIONS

This application is a U.S National Stage Application under 35 U.S.C. §371 of PCT Application No. PCT/KR2012/005411, filed Jul. 9, 2012, which claims priority to Korean Patent Application No. 10-2011-0142665, filed Dec. 26, 2011, whose entire disclosures are hereby incorporated by reference.

TECHNICAL FIELD

The present invention relates to a device and method for controlling an electric vehicle.

BACKGROUND ART

In general, an electric vehicle is equipped with an electromechanical tachometer that is attached to the driver seat and indicates distances travelled by driving a drive gear meshing with a wheel drive axle while the car is running to rotate a ring meshing with the drive gear. As such, the driver can figure out the distance the car has travelled, and this allows for evaluation of the reliability of the car. Also, other information provided to the driver contributes to the improvement of the reliability of the car. On the contrary, conventional electric vehicles provide only information about distances travelled, but do not provide the driver with information about how far the car can travel with the current battery state of charge.

A device and method for indicating how far an electric vehicle can travel with the remaining battery capacity according to the conventional art are disclosed in Korean Patent Application No. 10-1996-061936.

DISCLOSURE OF THE INVENTION

Therefore, an object of the present invention is to provide a device and method for controlling an electric vehicle that enables a user to easily control a predicted distance that can be travelled by displaying the predicted distance that can be travelled in response to the power consumption of electric loads on the electric vehicle.

To achieve these and other advantages and in accordance with the purpose of the present invention, as embodied and broadly described herein, there is provided a device for controlling an electric vehicle according to an embodiment of the present invention may include: a power consumption detector that detects a first power consumption of main electric loads associated with the operation of the electric vehicle and a second power consumption of optional electric loads on the electric vehicle; a control unit that determines a first predicted distance that can be travelled corresponding to the first power consumption detected and a second predicted distance that can be travelled corresponding to the second power consumption detected; and a display that displays the first and second predicted distances that can be travelled.

According to an example of the present invention, the control unit may display a graph of the first and second predicted distances on the display.

According to an example of the present invention, the control unit may calculate the total distance that can be travelled with the remaining battery capacity by adding the power consumption A of the main electric loads and the power consumption B of the optional electric loads, dividing the remaining battery capacity by the resultant value, and multiplying the resultant value by the battery's efficiency (fuel ratio) (km/kw) of the electric vehicle, determine the first predicted distance that can be travelled by Equation: first predicted distance that can be travelled=total distance that can be travelled s(A/(A+B)), and determine the second directed distance that can be travelled by Equation: second predicted distance that can be travelled=total distance that can be travelled s(B/(A+B)).

According to an example of the present invention, when the displayed first predicted distance is extended by the user, the control unit may deactivate the optional electric loads consuming the amount of power corresponding to the increase in order of priority.

According to an example of the present invention, the control unit may increase the displayed first predicted distance within the second predicted distance.

According to an example of the present invention, when information indicating the displayed second predicted distance is chosen, the control unit may display a control window for controlling the optional electric loads on the display.

According to an example of the present invention, when the controlling value of a first optional electric load is changed through the displayed control window, the control unit may control the first optional electric load based on the changed controlling value.

According to an example of the present invention, when the controlling value of the first optional electric load is fixed, the control unit may control the first optional electric load based on the fixed controlling value.

A method for controlling an electric vehicle according to an embodiment of the present invention may include: detecting a first power consumption of main electric loads associated with the operation of the electric vehicle and a second power consumption of optional electric loads on the electric vehicle; determining a first predicted distance that can be travelled corresponding to the first power consumption detected; determining a second predicted distance that can be travelled corresponding to the second power consumption detected; and displaying the first and second predicted distances that can be travelled on a display.

The device and method for controlling an electric vehicle according to embodiments of the present invention enable a user to control a predicted distance that can be travelled by displaying the predicted distance that can be travelled in response to the power consumption of electric loads on the electric vehicle and controlling the turn on/off of optional electric loads while seeing the displayed predicted distance that can be travelled.

The device and method for controlling an electric vehicle according to embodiments of the present invention enable a user to easily increase a predicted distance that can be travelled corresponding to the power consumption of main electric loads on the electric vehicle by deactivating, in order of priority, optional electric loads consuming the amount of power corresponding to an increase in predicted distance that occurs in response to the user's request.

The device and method for controlling an electric vehicle according to embodiments of the present invention can easily and quickly control optional electric loads that consume the amount of power corresponding to a predicted distance that the electric vehicle can travel when controlling the predicted distance.

The device and method for controlling an electric vehicle according to embodiments of the present invention allow for efficient control of optional electric loads that are set to a fixed value by the user when controlling a predicted distance that the electric vehicle can travel.

MODES FOR CARRYING OUT THE PREFERRED EMBODIMENTS

The technical terms used in the present specification are set forth to mention specific embodiments of the present invention, and do not intend to define the scope of the present invention. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Preferred embodiments of the present invention will be described below in detail with reference to the accompanying drawings where those components are rendered the same reference number that are the same or are in correspondence, regardless of the figure number, and redundant explanations are omitted.

In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

Hereinafter, embodiments of a battery control device and method which can minimize the battery consumption of an electric vehicle will be described in detail with reference to FIGS. 1 to 12.

Figure 1:
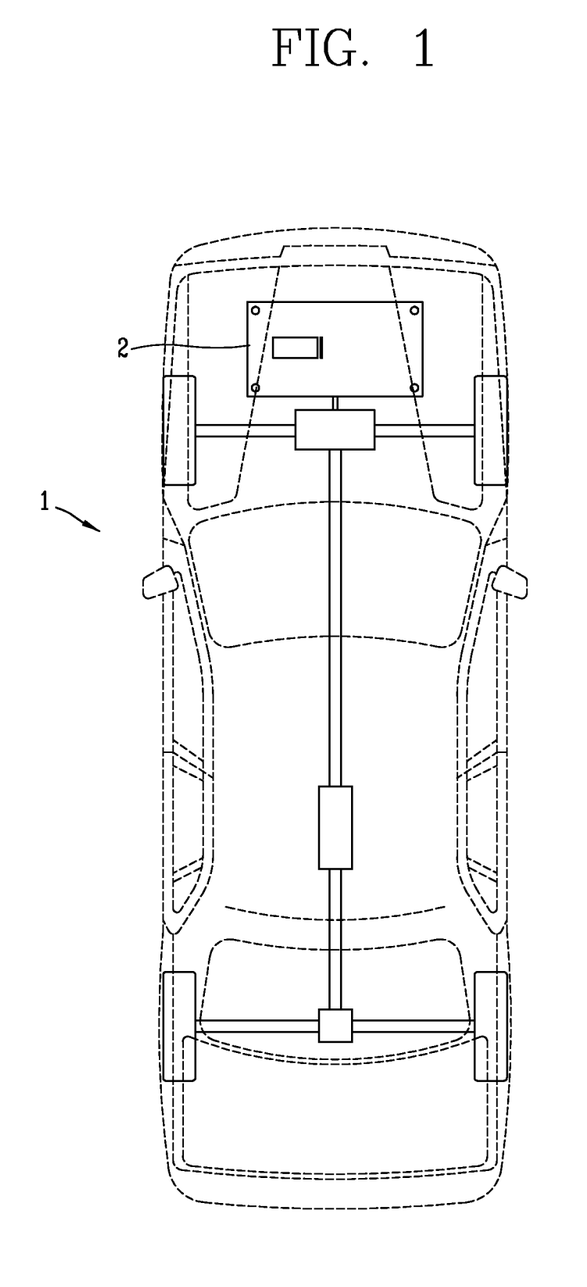
FIG. 1 is a view showing the battery of an electric vehicle for explaining an embodiment of the present invention.

FIG. 1 is a view showing the battery of an electric vehicle for explaining an embodiment of the present invention. The battery control device and method for explaining an embodiment of the present invention can be used on a variety of battery-powered electric/electronic equipment, as well as on pure electric vehicles and hybrid electric vehicles.

As shown in FIG. 1, an electric vehicle 1 includes a battery 2 that supplies power to a motor. For example, a hybrid electric vehicle (HEV) is equipped with a battery pack consisting of multiple battery cells to supply required power. The voltage of the individual battery cells included in the battery pack need to equalized in order to achieve safety, long lifespan, and high output. The battery control device allows each battery to have an appropriate voltage while charging or discharging the batteries of the battery pack. On the other hand, because many factors such as a change in internal impedance make it difficult to stably balance the multiple battery cells, a battery management system is equipped with a balancing function for balancing the state of charge in the multiple battery cells. For example, the state of charge (hereinafter, 'SOC') between the battery cells in the battery pack varies over time due to the differences in self-discharge rates between the battery cells in the battery pack. To smooth out the imbalance between the battery cells, each battery cell includes a circuit for boosting and/or bucking.

Figure 2:
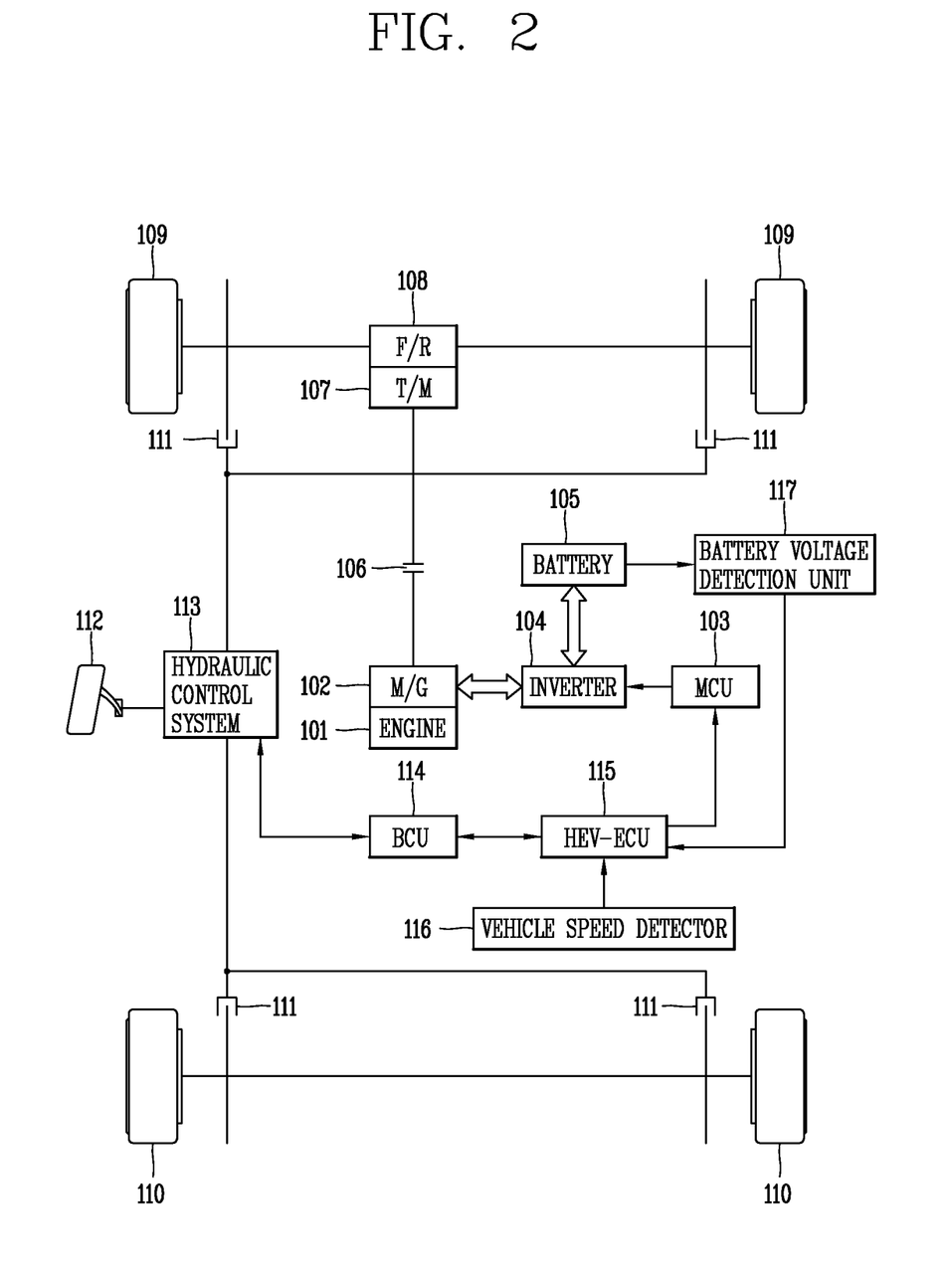
FIG. 2 is a view showing the configuration of a hybrid electric vehicle for explaining an embodiment of the present invention.

FIG. 2 is a view showing the configuration of a hybrid electric vehicle for explaining an embodiment of the present invention. The battery control device and method of the present invention are applicable to pure electric vehicle, as well as to hybrid electric vehicles.

As shown in FIG. 2, a hybrid electric vehicle includes an engine 101 and a motor/generator unit (hereinafter, abbreviated as 'M/G unit') 102 as power sources. The wheels driven by the power sources can be front wheels in a front-wheel drive vehicle or rear wheels in a rear wheel drive vehicle. Hereinafter, the front wheel drive vehicle will be described. An embodiment of the rear wheel drive vehicle will be obvious from the following description of the front wheel drive vehicle.

It is obvious to those skilled in the art that the M/G unit 102 optionally functions as a motor or a generator depending on the drive status. Accordingly, in the following description, the M/G unit 102 may be referred to as a motor or a generator for ease of comprehension, indicating the same component. The engine 101 and motor 102 of the electric vehicle are connected in series to a transmission.

The M/G unit 102 is driven by a signal from an inverter 104 under control of a motor control unit (MCU) 103.

The inverter 104 drives the M/G unit 102 as a source of power by electric energy stored in the battery 105 under control of the MCU 103. When driving the M/G unit 102 as a generator, the inverter 104 charges a battery 105 with electric energy generated by the M/G unit 102.

The power of the engine 101 and the M/G unit 102 is transmitted to the transmission (T/M) 107 through a clutch 106, and transmitted to front wheels 109 through a final drive gear (F/R) 108. Rear wheels 110 are a non-driven wheels, which are not driven by the engine 101 and the M/G unit 102.

A wheel brake apparatus 111 is mounted on each of the front and rear wheels 109 and 110 to reduce the rotation speed of each wheel. The hybrid electric vehicle includes a brake pedal 112 and a hydraulic control system 113 that hydraulically controls each wheel brake apparatus 111 based on oil pressure generated according to manipulation of the brake pedal 112, in order to drive each wheel brake apparatus 111. The electric vehicle includes a brake control unit (BCU) 114 that controls the hydraulic control system 113 and receives a brake control state from the hydraulic control system 113.

When a driver manipulates the brake pedal 112, the BCU 114 detects oil pressure generated from the hydraulic control system 113. The BCU 114 calculates a braking force to be applied to the driven wheels (e.g., the front wheels 109), a hydraulic braking force to be braked by oil pressure, and a regenerative braking force to be braked by regenerative braking based on the detected oil pressure. Accordingly, the BCU 114 supplies the calculated hydraulic braking force to the wheel brake apparatuses 111 of the front wheels 109 under the control of the hydraulic control system 113.

The electric vehicle includes a hybrid electric vehicle-electronic control unit (HEV-ECU) 115 communicating with the BCU 114 and the MCU 103 to control them to implement an electric vehicle that performs a maximum speed limiting method.

The regenerative braking force calculated by the BCU 114 is transmitted to the HEV-ECU 115, and the HEV-ECU 115 controls the MCU 103 based on the received regenerative braking force. Accordingly, the MCU 103 drives the M/G unit 102 as a generator such that the regenerative braking force designated by the HEV-ECU 115 can be applied. At this time, electric energy generated by the M/G unit 102 is stored in the battery 105.

The electric vehicle further includes a vehicle speed detector 116 for detecting a vehicle speed.

The HEV-ECU 115 utilizes the vehicle speed detected by the vehicle speed detector 116 as data for controlling the BCU 114 and the MCU 103.

The electric vehicle further includes a battery voltage detection unit 117 for detecting the voltage (or current) of the battery 105. The battery voltage detection unit 117 detects the current voltage of the battery 105, and provides result data to allow the HEV-ECU 115 to limit the maximum speed of the electric vehicle according to a deviation between the detected current voltage and a pre-set reference voltage.

The electric vehicle drives the motor by using the battery, thus the life span of the battery is a key element of the electric vehicle. The voltage of each of the battery cells of the battery slightly changes over time. Such imbalance is one major factor that reduces the life span of the battery. Thus, in order to prevent such imbalance of the battery cells to lengthen the life span of the battery, most electric vehicles must continuously perform cell balancing. The cell balancing is a method of discharging current by connecting a small load to a battery cell having a high voltage, thus allowing the battery cell to have the same voltage as other cells.

Hereinafter, the configuration of a telematics terminal 200 for explaining an embodiment of the present invention will be described with reference to FIG. 3.

Figure 3:
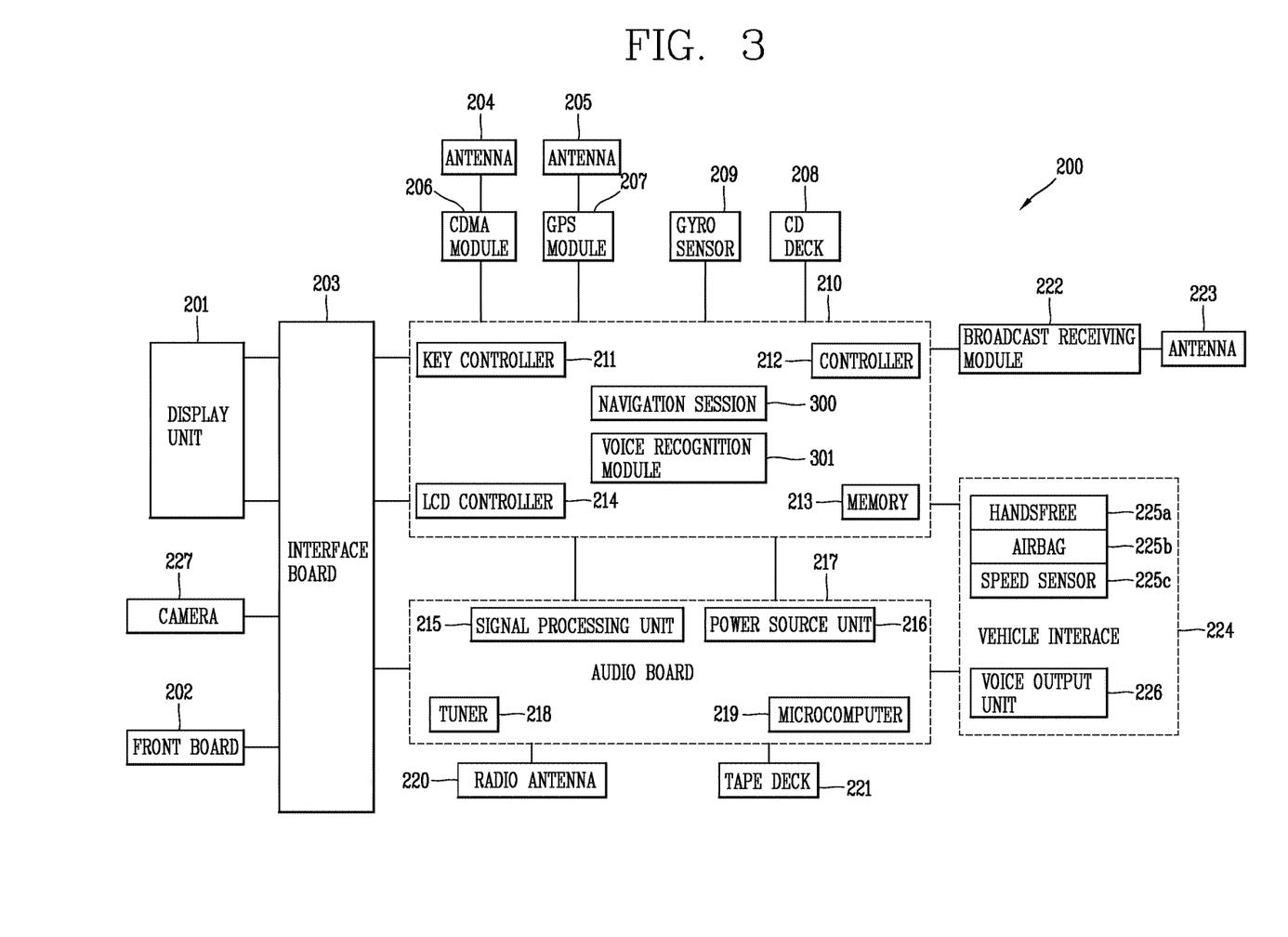
FIG. 3 is a block diagram showing the configuration of a telematics terminal 200 for explaining an embodiment of the present invention.

FIG. 3 is a block diagram showing the configuration of a telematics terminal 200 for explaining an embodiment of the present invention.

As shown in FIG. 3, the telematics terminal 200 includes a controller (e.g., a central processing unit (CPU)) 212 for performing an overall control of the telematics terminal 200, a memory 213 for storing a variety of information, a key controller 211 for controlling a variety of key signals, and a main board 210 having an LCD controller 214 for controlling an liquid crystal display (LCD) therein.

The memory 213 stores map information (map data) for displaying road guide information on a digital map. Also, the memory 213 stores a traffic information collecting control algorithm for inputting traffic information according to the situation of a road along which the vehicle currently travels (runs), and information for controlling the algorithm.

The main board 210 includes a CDMA module 206, i.e., a mobile communication terminal with a unique device number assigned to it which is installed in the vehicle, a GPS module 207 for guiding the location of the vehicle, receiving a GPS signal for tracking a travel route from a start point to a destination, or transmitting traffic information collected by the user as a GPS signal, a CD deck 208 for reproducing a signal recorded in a CD (Compact Disk), a gyro sensor 209, etc. The CDMA module 206 and the GPS module 207 receive signals via antennas 204 and 205.

A broadcast receiving module 222 is connected to the main board 210 and receives broadcast signals through an antenna 223. The main board 210 is connected via an interface board 203 to a display unit (LCD) 201 controlled by the LCD controller 214, a front board 202 controlled by the key controller 211, and a camera 227 for capturing the inside and/or outside of the vehicle. The display unit 201 also displays a variety of video signals and text signals, and the front board 202 includes buttons for allowing the input of a variety of key signals so as to provide a key signal corresponding to a button selected by the user to the main board 210. In addition, the display unit 201 includes a proximity sensor and a touch sensor (touch screen) that are shown in FIG. 2.

The front board 202 includes a menu key for allowing direct input of traffic information, and the menu key may be configured to be controlled by the key controller 211.

The audio board 217 is connected to the main board 210, and processes a variety of audio signals. The audio board 217 includes a microcomputer 219 for controlling the audio board 217, a tuner 218 for receiving a radio signal, a power unit 216 for supplying power to the microcomputer 219, and a signal processing unit 215 for processing a variety of voice signals.

The audio board 217 includes a radio antenna 220 for receiving a radio signal and a tape deck 221 for reproducing an audio tape. The audio board 217 may further include a voice output unit (amplifier) 226 for outputting a voice signal processed by the audio board 217.

The voice output unit (amplifier) 226 is connected to a vehicle interface 224. In other words, the audio board 217 and the main board 210 are connected to the vehicle interface 224. A hands-free unit 225a for inputting a voice signal, an airbag 225b for passenger safety, a speed sensor 225c for detecting a vehicle speed and the like are connected to the vehicle interface 224. Also, the speed sensor 225c calculates a vehicle speed, and provides the calculated vehicle speed information to the central processing unit 212.

A mobile vehicle navigation session 300 applied to the telematics terminal 200 generates road guide information based on map data and current vehicle location information, and notifies the user of the generated road guide information.

The display unit 201 senses a proximity touch within the display window through the proximity sensor. For example, when a pointer (for example, finger or stylus pen) is proximity-touched, the display unit 201 detects the position of the proximity touch, and outputs position information corresponding to the detected position to the controller 212.

A voice recognition device (or voice recognition module) 301 recognizes the user's voice, and performs a relevant function based on the recognized voice signal.

The navigation session 300 applied to the mobile communication terminal 200 also displays a travel path on map data, and automatically forms a wireless network together with a terminal (for example, vehicle navigation device) mounted on a neighboring vehicle and/or a mobile communication terminal a pedestrian nearby is carrying through wireless communication (for example, short-range wireless communication network) when the location of the mobile communication terminal 100 is within a predetermined distance from a dead zone included in the travel path. Thus, the navigation session 300 can receive the location information of the neighboring vehicle from the terminal mounted on the neighboring vehicle, and receive the location information of the pedestrian nearby from the mobile communication terminal the pedestrian is carrying.

Hereinafter, a device for controlling an electric vehicle according to a first embodiment of the present invention that enables a user to easily control a predicted distance that can be travelled by displaying the predicted distance that can be travelled in response to the power consumption of electric loads on the electric vehicle will be described with reference to FIGS. 1 to 8. The control device according to embodiments of the present invention may be configured as a stand-alone device or applied to the telematics terminal 200 of FIG. 3.

Figure 4:
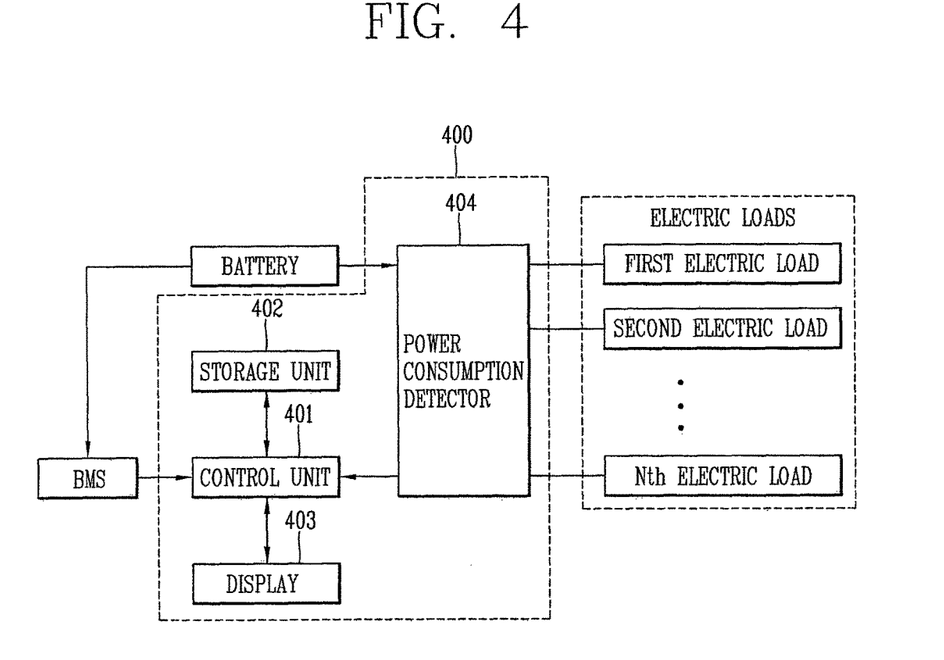
FIG. 4 is a view showing the configuration of a device for controlling an electric vehicle according to a first embodiment of the present invention.

FIG. 4 is a view showing the configuration of a device for controlling an electric vehicle according to a first embodiment of the present invention.

As shown in FIG. 4, the device 400 for controlling the electric vehicle includes: a power consumption detector 404 that detects a first power (or current) consumption of main electric loads associated with the operation of the electric vehicle and a second power consumption of optional electric loads on the electric vehicle; a control unit 401 that determines a first predicted distance that can be travelled (first predicted distance that the electric vehicle can travel) corresponding to the first power consumption detected and a second predicted distance that can be travelled (second predicted distance that the electric vehicle can travel) corresponding to the second power consumption detected; and a display 403 that displays the first and second predicted distances that can be travelled.

The device for controlling the electric vehicle 400 may further include a storage unit 402 that stores the first and second power consumption, the first and second predicted distances that can be travelled, various programs, data, etc.

The main electric loads associated with the operation of the electric vehicle may represent electric loads essentially needed to operate the electric vehicle, such as a motor that turns the wheels of the electric vehicle, a direction indicator lamp, a brake lamp, and headlights. The optional electric loads of the electric vehicle may represent optional electric loads such as a heater, an air conditioner, multimedia equipment, a massage chair, and front/rear cameras installed in the electric vehicle.

The second predicted distance that can be travelled represents the distance that the electric vehicle can travel when the user turns off the optional electric loads of the electric vehicle. Each time the user turns off the optional electric loads of the electric vehicle one by one, the control unit 401 adds, in real time, a distance that can be travelled corresponding to the power consumption of a turned-off electric load to the first predicted distance that can be travelled, and displays the resultant first predicted distance that can be travelled on the display 403. That is, the user can trade off between the main electric loads and the optional electric loads by adjusting the ratio of the power consumption of the main electric loads and the power consumption of the optional electric loads.

The control unit 401 can calculate the total distance that can be travelled with the remaining battery capacity by adding the power consumption per hour A of the main electric loads and the power consumption per hour B of the optional electric loads, dividing the remaining battery capacity by the resultant value, and multiplying the resultant value by the battery's efficiency (fuel ratio) (e.g., 10 km per kilowatt-hour) of the electric vehicle.

(A) may denote power consumption per hour based on a value obtained by multiplying the power consumption of the main electric loads by a weighting factor (e.g., weighting factor reflecting the driver's propensity). (B) may denote the total power consumption per hour of the optional electric loads.

The control unit 401 may determine the first predicted distance that can be travelled by the following Equation 1 and the second directed distance that can be travelled by the following Equation 2:

$$\text{First predicted distance that can be travelled} = \text{total distance that can be travelled} * (A/(A+B)) \qquad [\text{Equation 1}]$$

$$\text{Second predicted distance that can be travelled} = \text{total distance that can be travelled} * (B/(A+B)) \qquad [\text{Equation 2}]$$

where A may denote the total power consumption per hour of the main electric loads, and B may denote the total power consumption per hour of the optional electric loads.

Figure 5:
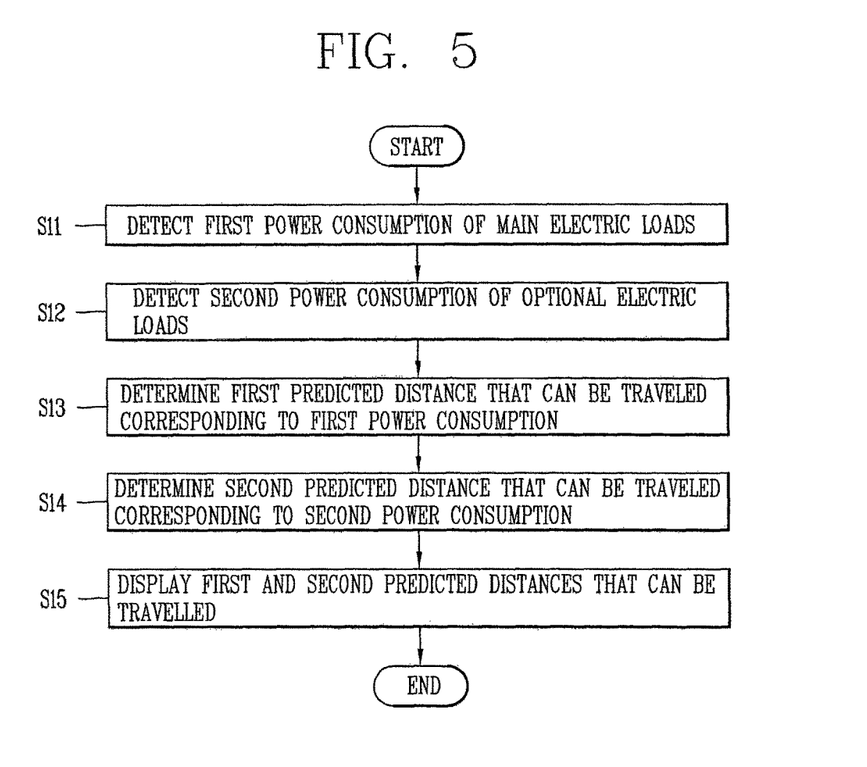
FIG. 5 is a flowchart showing a method for controlling an electric vehicle according to the first embodiment of the present invention.

FIG. 5 is a flowchart showing a method for controlling an electric vehicle according to the first embodiment of the present invention.

First of all, when the electric vehicle is started or the electric vehicle travels, the power consumption detector 404 detects, in real time, a first power (or current) consumption of main electric loads associated with the operation of the electric vehicle and a second power consumption of optional electric loads on the electric vehicle, and outputs the detected first and second power consumption to the control unit 401 (S11 and S12). For example, when the electric vehicle is started or the electric vehicle travels, the power consumption detector 404 may detect the total power consumption per hour (first power consumption) of main electric loads associated with the operation of the electric vehicle and the total power consumption per hour (second power consumption) of optional electric loads on the electric vehicle.

The control unit 401 can calculate the total distance that can be travelled by adding the first power consumption and the second power consumption, dividing the remaining battery capacity by the resultant value, and multiplying the resultant value by the battery's efficiency (fuel ratio) (e.g., 10 km per kilowatt-hour) of the electric vehicle.

The control unit 401 can display the calculated total distance that can be travelled on the display 403.

Figure 6:
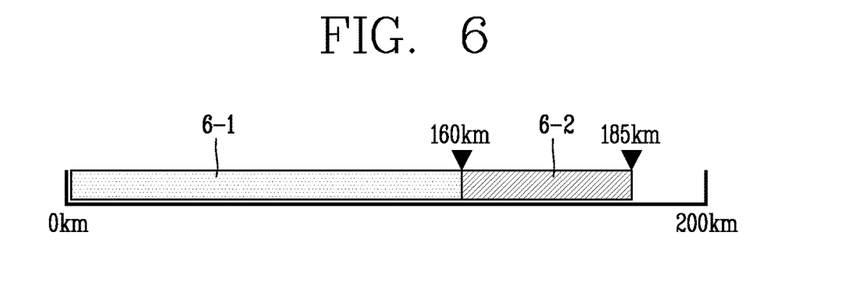
FIG. 6 is an illustration showing a total distance that can be travelled displayed on a display according to the first embodiment of the present invention.

FIG. 6 is an illustration showing a total distance that can be travelled displayed on a display according to the first embodiment of the present invention.

As shown in FIG. 6, the control unit 401 receives information corresponding to the current remaining capacity of the battery from a battery management system BMS, calculates the total distance that can be travelled (e.g., 185 km) by adding the first power consumption and the second power consumption, dividing the current remaining capacity of the battery by the resultant value, and multiplying the resultant value by the battery's efficiency (fuel ratio) of the electric vehicle, and displays a graph (e.g., bar graph, circle graph, etc) of the calculated total distance that can be travelled (e.g., 185 km) on the display 403.

The control unit 401 determines a first predicted distance (e.g., 160 km) that can be travelled (first predicted distance that the electric vehicle can travel) corresponding to the first power consumption detected (S13). For example, the control unit 401 determines the first predicted distance that can be travelled by Equation 1, and displays a graph (e.g., bar graph, circle graph, etc) of the determined first predicted distance 6-1 that can be travelled on the display 403. That is, the control unit 401 displays, on the display 403, the ratio of the total distance that can be travelled displayed on the display 403 divided by the first predicted distance 6-1 that can be travelled.

The control unit 401 determines a second predicted distance (e.g., 25 km) that can be travelled (second predicted distance that the electric vehicle can travel) corresponding to the second power consumption detected (S14). For example, the control unit 401 determines the second predicted distance that can be travelled by Equation 2, and displays a graph (e.g., bar graph, circle graph, etc) of the determined second predicted distance 6-2 that can be travelled on the display 403. That is, the control unit 401 displays, on the display 403, the ratio of the total distance that can be travelled displayed on the display 403 divided by the first and second predicted distances 6-1 and 6-2 that can be travelled (S15).

The device and method for controlling an electric vehicle according to the first embodiment of the present invention enables a user to control a predicted distance that can be travelled by displaying the predicted distance that can be travelled in response to the power consumption of electric loads on the electric vehicle and controlling the turn on/off of optional electric loads while seeing the displayed predicted distance that can be travelled.

Hereinafter, a device for controlling an electric vehicle according to a second embodiment of the present invention that enables a user to easily control a predicted distance that can be travelled by displaying the predicted distance that can be travelled in response to the power consumption of electric loads on the electric vehicle will be described with reference to FIGS. 4 to 10.

Figure 7:
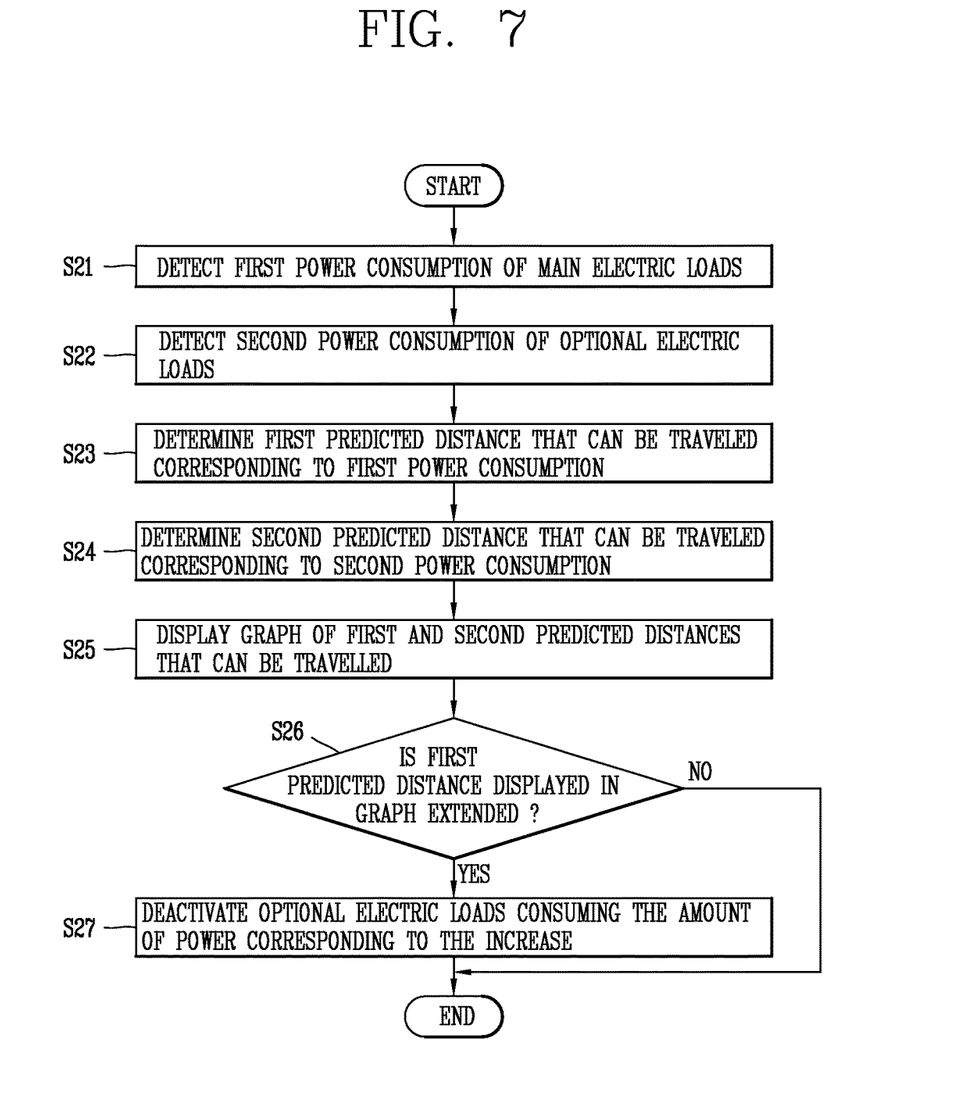
FIG. 7 is a flowchart showing a method for controlling an electric vehicle according to a second embodiment of the present invention.

FIG. 7 is a flowchart showing a method for controlling an electric vehicle according to a second embodiment of the present invention.

First of all, when the electric vehicle is started or the electric vehicle travels, the power consumption detector 404 detects, in real time, a first power (or current) consumption of main electric loads associated with the operation of the electric vehicle and a second power consumption of optional electric loads on the electric vehicle, and outputs the detected first and second power consumption to the control unit 401 (S21 and S22). For example, when the electric vehicle is started or the electric vehicle travels, the power consumption detector 404 may detect the first power (or current) consumption per hour of main electric loads associated with the operation of the electric vehicle and the second power (current) consumption per hour of optional electric loads on the electric vehicle.

The control unit 401 can calculate the total distance that can be travelled by adding the first power consumption and the second power consumption, dividing the remaining battery capacity by the resultant value, and multiplying the resultant value by the battery's efficiency (fuel ratio) (e.g., 10 km per kilowatt-hour) of the electric vehicle.

The control unit 401 determines a first predicted distance that can be travelled (first predicted distance that the electric vehicle can travel) corresponding to the first power consumption detected (S23). For example, the control unit 401 determines the first predicted distance that can be travelled by Equation 1, and displays a graph (e.g., bar graph, circle graph, etc) of the determined first predicted distance 6-1 on the display 403. That is, the control unit 401 displays, on the display 403, the ratio of the total distance that can be travelled displayed on the display 403 divided by the first predicted distance 6-1.

The control unit 401 determines a second predicted distance that can be travelled (second predicted distance that the electric vehicle can travel) corresponding to the second power consumption detected (S24). For example, the control unit 401 determines the second predicted distance that can be travelled by Equation 2, and displays a graph (e.g., bar graph, circle graph, etc) of the determined second predicted distance 6-2 on the display 403. That is, the control unit 401 displays, on the display 403, a graph (e.g., bar graph, circle graph, etc) of the ratio of the total distance that can be travelled displayed on the display 403 divided by the first and second predicted distances 6-1 and 6-2 that can be travelled (S25).

The control unit 401 determines whether the displayed first predicted distance 6-1 is extended by the user (S26).

Figure 8:
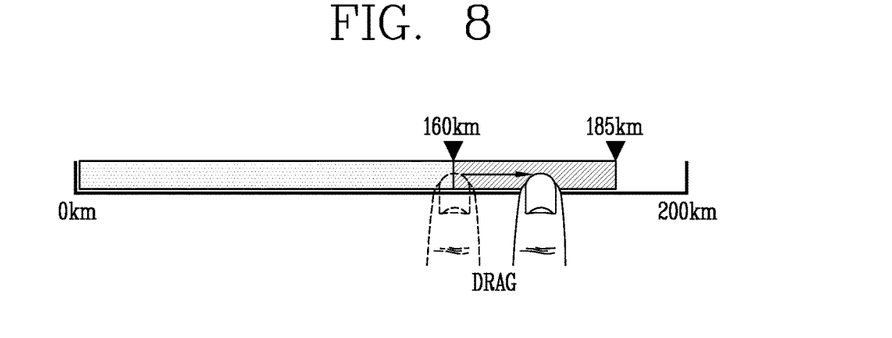
FIGS. 8 and 9 are illustrations showing first and second distances that can be travelled displayed on a display according to the second embodiment of the present invention.
Figure 9:
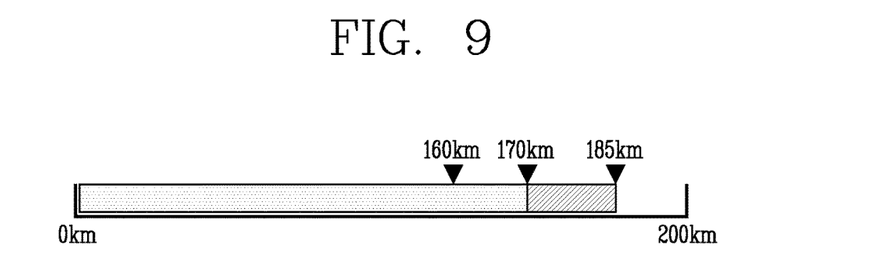

FIGS. 8 and 9 are illustrations showing first and second distances that can be travelled displayed on a display according to the second embodiment of the present invention.

As shown in FIGS. 8 and 9, the control unit 401 determines whether the first predicted distance 6-1 is extended by the user's dragging the bar corresponding to the first predicted distance 6-1. Here, the control unit 401 may allow the user to extend the bar (e.g., 160 km) corresponding to the first predicted distance 6-1 to the bar (e.g., 185 km) corresponding to the second predicted distance 6-2.

When the displayed first predicted distance 6-1 (160 km) is extended (from 160 km to 170 km, for example) by the user, the control unit 401 increases the first predicted distance 6-1 by turning off the optional electric loads consuming the amount of power corresponding to the increase (170 km−160 km=10 km, for example) in order of priority or reducing the level of power applied to the optional electric loads (S27). For example, assuming that the displayed first predicted distance 6-1 is 160 km and the user has extended it by 10 km by dragging the bar corresponding to the displayed first predicted distance 6-1, the control unit 401 deactivates low-priority optional electric loads (e.g., massage chair), among the optional electric loads such as a heater, an air conditioner, multimedia equipment, a massage chair, and front/rear cameras installed in the electric vehicle.

When the bar corresponding to the first or second predicted distance 6-1 or 6-2 is chosen (e.g., touched or clicked) by the user, the control unit 401 may display a variety of preferred modes on the display 403 and activate or deactivate the optional electric loads according to a preferred mode chosen by the user.

Figure 10:
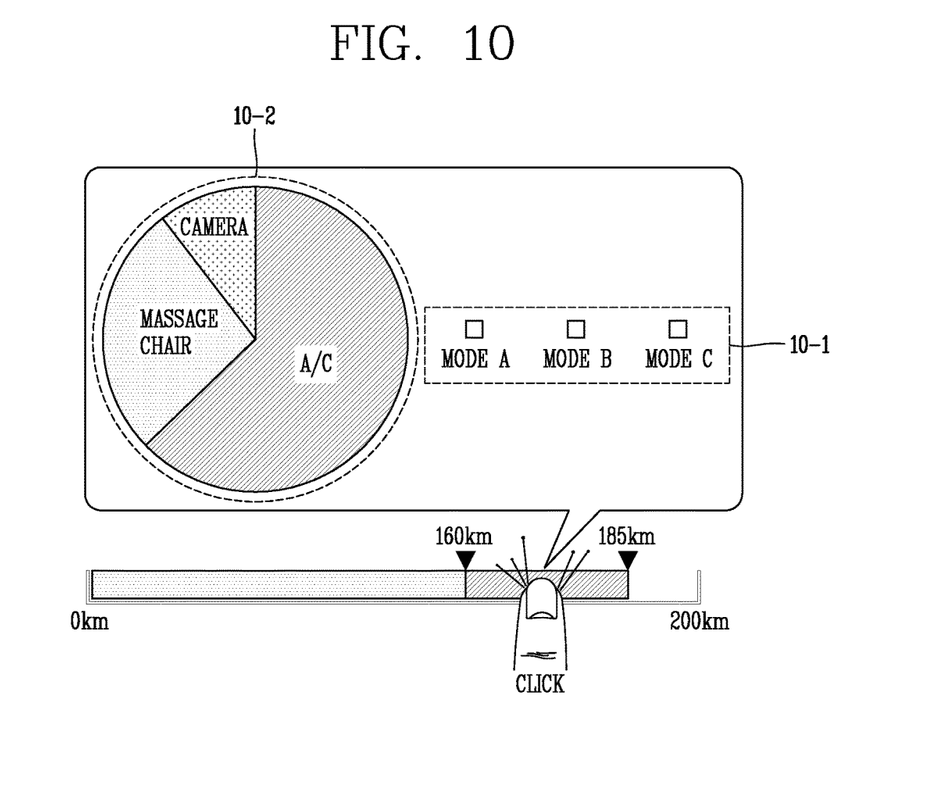
FIG. 10 is an illustration showing preferred modes displayed on the display according to the second embodiment of the present invention.

FIG. 10 is an illustration showing preferred modes displayed on the display according to the second embodiment of the present invention.

As shown in FIG. 10, the control unit 401 may display on the display 403 a variety of preferred modes 10-1 including: an inside temperature-preferred mode (Mode A) for preferentially activating an air conditioner or heater to control the inside temperature of the electric vehicle; an entertainment-preferred mode (Mode B) for preferentially activating multimedia equipment (audio and video equipment) (ETC) of the electric vehicle; and an auto mode (Mode C) for activating the optional electric modes of the electric vehicle in order of priority.

For example, assuming that the displayed first predicted distance 6-1 is 160 km, the user has extended it by 10 km by dragging the bar corresponding to the displayed first predicted distance 6-1, and the user has chosen the inside temperature-preferred mode (Mode A), the control unit 401 may increase the first predicted distance by 10 km by deactivating all of the optional electric loads, except the heater or air conditioner (A/C).

For example, assuming that the displayed first predicted distance 6-1 is 160 km, the user has extended it by 10 km by dragging the bar corresponding to the displayed first predicted distance 6-1, and the user has chosen the entertainment-preferred mode (Mode B), the control unit 401 may increase the first predicted distance by 10 km by deactivating all of the optional electric loads, except the multimedia equipment.

For example, assuming that the displayed first predicted distance 6-1 is 160 km, the user has extended it by 10 km by dragging the bar corresponding to the displayed first predicted distance 6-1, and the user has chosen the auto mode (Mode C), the control unit 401 may increase the first predicted distance by 10 km by deactivating all of the optional electric loads in reverse order of priority.

When the bar corresponding to the first or second predicted distance 6-1 or 6-2 is chosen (e.g., touched or clicked) by the user, the control unit 401 may display on the display 403 a circular ratio graph 10-2 of information such as the power consumption of electric loads consuming the amount of power corresponding to the first or second predicted distance 6-1 or 6-2, the ratio of the power consumption of the electric loads to the total power consumption.

When the power consumption (or the proportion of the power consumption) of a specific optional electric load on the circular ratio graph 10-2 is changed by the user, the control unit 401 may add or subtract a predicted distance that can be travelled corresponding to the change to or from the first predicted distance, and display the resultant first predicted distance on the display 403.

Accordingly, the device and method for controlling an electric vehicle according to the second embodiment of the present invention enable a user to easily increase a predicted distance that can be travelled corresponding to the power consumption of main electric loads on the electric vehicle by deactivating, in order of priority, optional electric loads consuming the amount of power corresponding to an increase in predicted distance that occurs in response to the user's request.

Hereinafter, a device for controlling an electric vehicle that enables a user to easily control a predicted distance that can be travelled by displaying the predicted distance that can be travelled in response to the power consumption of electric loads on the electric vehicle will be described with reference to FIGS. 4 to 12.

Figure 11:
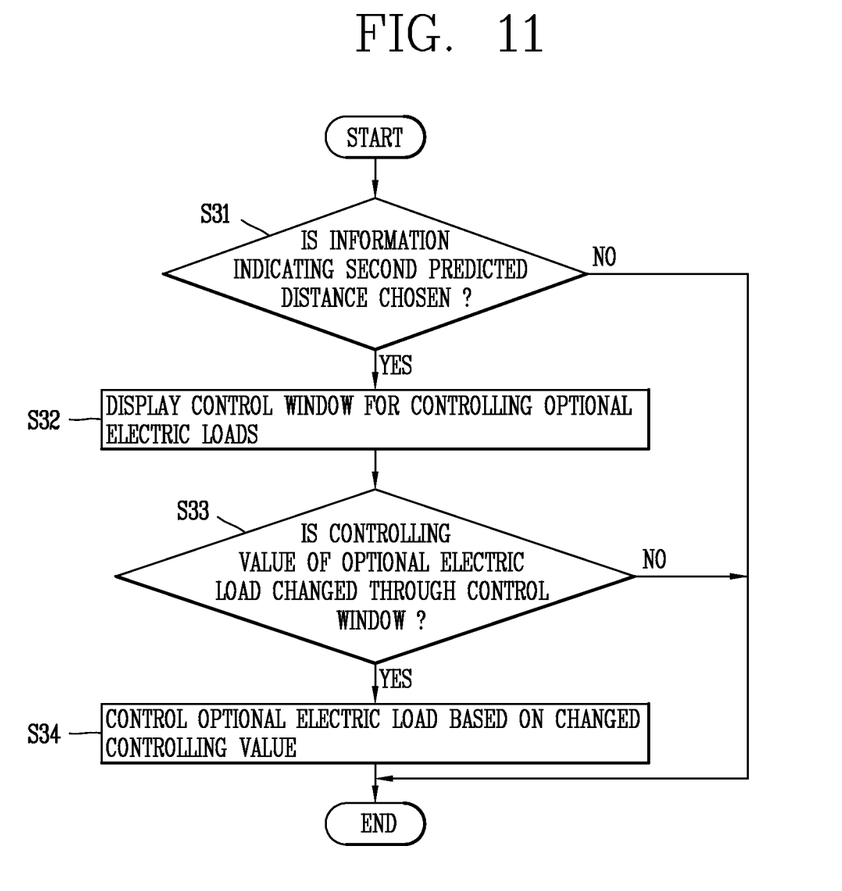
FIG. 11 is a flowchart showing a method for controlling an electric vehicle according to a third embodiment of the present invention.

FIG. 11 is a flowchart showing a method for controlling an electric vehicle according to a third embodiment of the present invention.

First of all, when the electric vehicle is started or the electric vehicle travels, the power consumption detector 404 detects, in real time, a first power (or current) consumption of main electric loads associated with the operation of the electric vehicle and a second power consumption of optional electric loads on the electric vehicle, and outputs the detected first and second power consumption to the control unit 401.

The control unit 401 can calculate the total distance that can be travelled by adding the first power consumption and the second power consumption, dividing the remaining battery capacity by the resultant value, and multiplying the resultant value by the battery's efficiency (fuel ratio) (e.g., 10 km per kilowatt-hour) of the electric vehicle.

The control unit 401 determines a first predicted distance that can be travelled (first predicted distance that the electric vehicle can travel) corresponding to the first power consumption detected.

The control unit 401 determines a second predicted distance that can be travelled (second predicted distance that the electric vehicle can travel) corresponding to the second power consumption detected. For example, the control unit 401 displays, on the display 403, a graph (e.g., bar graph, circle graph, etc) of the ratio of the total distance that can be travelled displayed on the display 403 divided by the first and second predicted distances 6-1 and 6-2.

The control unit 401 determines whether the user has chosen information indicating the displayed second predicted distance 6-2 (e.g. the bar indicating the displayed second predicted distance 6-2) (S31).

When the user chooses information indicating the displayed second predicted distance 6-2 (e.g. the bar indicating the displayed second predicted distance 6-2), the control unit 401 displays a control window for controlling the optional electric loads on the display 403 (S32).

Figure 12:
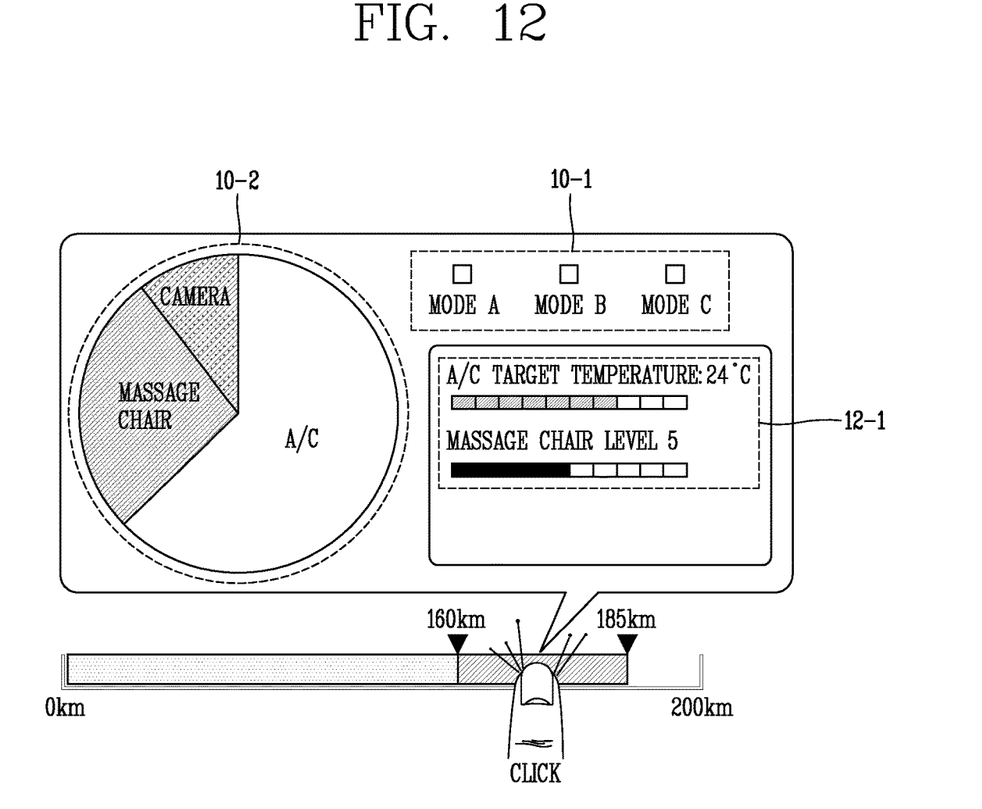
FIG. 12 is an illustration showing a control window displayed on a display according to a third embodiment of the present invention.

FIG. 12 is an illustration showing a control windows displayed on a display according to a third embodiment of the present invention.

As shown in FIG. 12, the control unit 401 may display, on the display 403, a control window for controlling a variety of optional electric loads, such as an air conditioner control window containing a key or menu for regulating the temperature of the air conditioner (A/C) corresponding to one of the optional electric loads and information indicating the currently set inside temperature (target temperature) for the electric vehicle, a massage chair control window 12-1 containing the current level of the massage chair corresponding to one of the optional electric loads and a key or menu for controlling the level, or a heater control window containing a key or menu for regulating the temperature of the heater corresponding to one of the optional electric loads and indicating the currently set inside temperature (target temperature) for the electric vehicle.

The control unit 401 determines whether the controlling value (air conditioner temperature level) of a specific optional electric load is changed, through the control window (e.g., air conditioner control window) for controlling the specific optional electric load (S33). For example, the control unit 401 determines whether the user has increased or decreased the target temperature (controlling value) of the air conditioner, through the air conditioner control window for controlling the air conditioner. Also, the control unit 401 determines whether the user has increased or decreased the intensity (controlling value) of the massage chair, through the massage chair control window for controlling the massage chair.

The control unit 401 controls the specific optional electric load (air conditioner) based on the changed controlling value (S34). For example, the control unit 401 controls the air conditioner based on the changed target temperature (controlling value) of the air conditioner. Also, the control unit 401 controls the massage chair based on the changed intensity (controlling value) of the massage chair.

Accordingly, the device and method for controlling an electric vehicle according to the third embodiment of the present invention can easily and quickly control optional electric loads that consume the amount of power corresponding to a predicted distance that the electric vehicle can travel when controlling the predicted distance.

Hereinafter, a device for controlling an electric vehicle that enables a user to easily control a predicted distance that can be travelled by displaying the predicted distance that can be travelled in response to the power consumption of electric loads on the electric vehicle will be described with reference to FIGS. 4 to 14.

Figure 13:
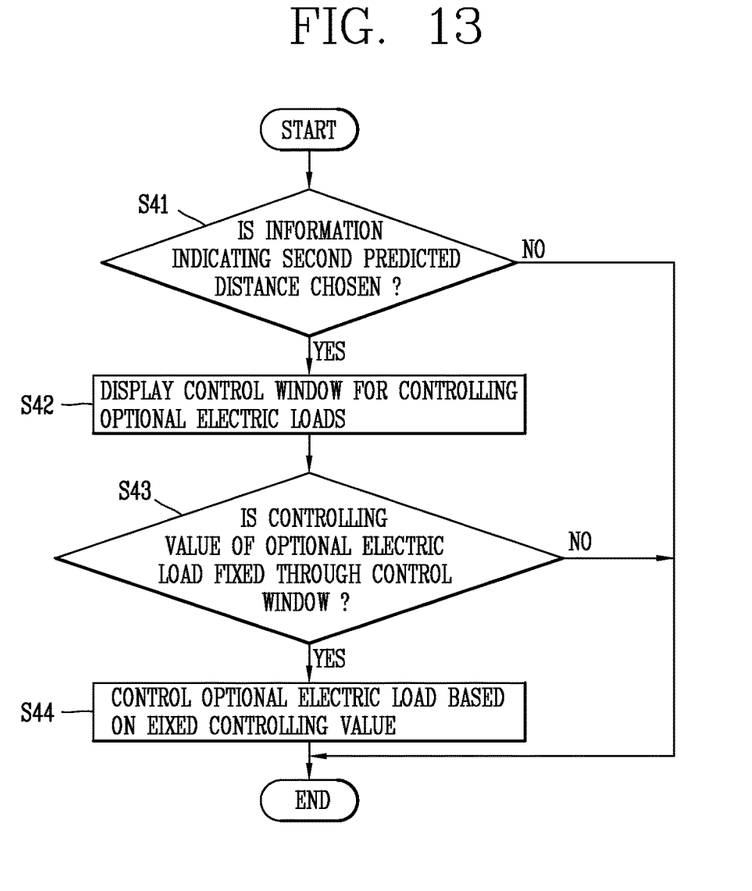
FIG. 13 is a flowchart showing a method for controlling an electric vehicle according to a fourth embodiment of the present invention.

FIG. 13 is a flowchart showing a method for controlling an electric vehicle according to a fourth embodiment of the present invention.

First of all, when the electric vehicle is started or the electric vehicle travels, the power consumption detector 404 detects, in real time, a first power (or current) consumption of main electric loads associated with the operation of the electric vehicle and a second power consumption of optional electric loads on the electric vehicle, and outputs the detected first and second power consumption to the control unit 401.

The control unit 401 can calculate the total distance that can be travelled by adding the first power consumption and the second power consumption, dividing the remaining battery capacity by the resultant value, and multiplying the resultant value by the battery's efficiency (fuel ratio) (e.g., 10 km per kilowatt-hour) of the electric vehicle.

The control unit 401 determines a first predicted distance that can be travelled (first predicted distance that the electric vehicle can travel) corresponding to the first power consumption detected.

The control unit 401 determines a second predicted distance that can be travelled (second predicted distance that the electric vehicle can travel) corresponding to the second power consumption detected. For example, the control unit 401 displays, on the display 403, a graph (e.g., bar graph, circle graph, etc) of the ratio of the total distance that can be travelled displayed on the display 403 divided by the first and second predicted distances 6-1 and 6-2.

The control unit 401 determines whether the user has chosen information indicating the displayed second predicted distance 6-2 (e.g. the bar indicating the displayed second predicted distance 6-2) (S41).

When the user chooses information indicating the displayed second predicted distance 6-2 (e.g. the bar indicating the displayed second predicted distance 6-2), the control unit 401 displays a control window for controlling the optional electric loads on the display 403 (S42). For example, the control unit 401 may display, on the display 403, a control window for controlling a variety of optional electric loads, such as an air conditioner control window containing a key or menu for regulating the temperature of the air conditioner (A/C) corresponding to one of the optional electric loads and information indicating the currently set inside temperature (target temperature) for the electric vehicle, a massage chair control window 12-1 containing the current level of the massage chair corresponding to one of the optional electric loads and a key or menu for controlling the level, or a heater control window containing a key or menu for regulating the temperature of the heater corresponding to one of the optional electric loads and indicating the currently set inside temperature (target temperature) for the electric vehicle.

The control unit 401 determines whether the controlling value (air conditioner temperature level) of a specific optional electric load is fixed, through the control window (e.g., air conditioner control window) for controlling the specific optional electric load (S43). For example, the control unit 401 determines whether the user has fixed the target temperature (e.g., 24 degrees) of the air conditioner at a specific level (e.g., 20 degrees), through the air conditioner control window for controlling the air conditioner. Also, the control unit 401 determines whether the user has fixed the intensity (controlling value) of the massage chair at a specific level, through the massage chair control window for controlling the massage chair. When a specific one (e.g., air conditioner temperature level) of the controlling values of the specific optional electric load is long clicked, the control unit 401 sets the long-clicked controlling value as a fixed value.

When the controlling value (e.g., air conditioner temperature level) of the specific optional electric load is fixed, the control unit 401 controls the specific optional electric load to maintain the fixed value. For example, assuming that the displayed first predicted distance 6-1 is 160 km, the user has extended it by 10 km by dragging the bar corresponding to the displayed first predicted distance 6-1, and the target temperature of the air conditioner is fixed at 20 degrees, the control unit 401 decreases the power applied to optional electric loads such as such as a heater, an air conditioner, multimedia equipment, a massage chair, and front/rear cameras installed in the electric vehicle by the amount of power corresponding to 10 km, and if the inside temperature of the electric vehicle becomes equal to or below 20 degrees, decreases the power applied to other optional electric loads having no fixed value.

Figure 14:
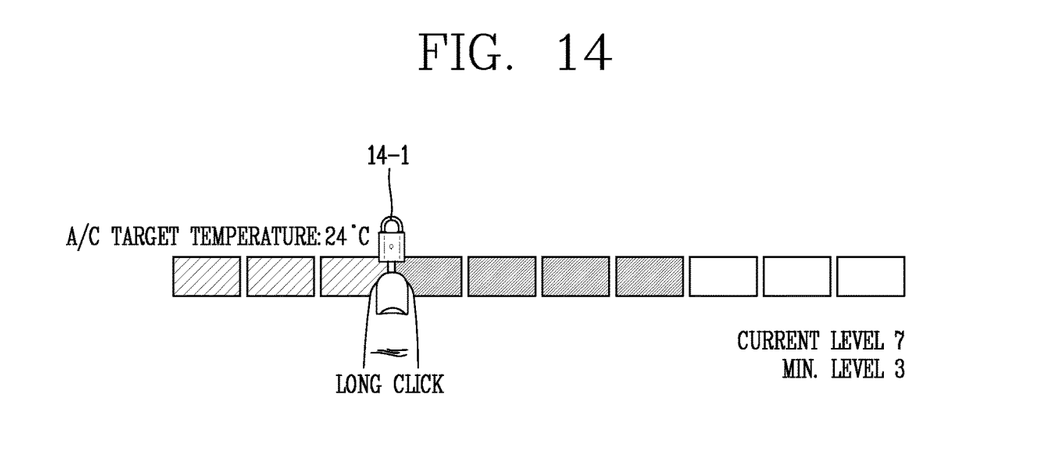
FIG. 14 is a flowchart showing a fixed control value according to the fourth embodiment of the present invention.

FIG. 14 is a flowchart showing a fixed control value according to the fourth embodiment of the present invention.

When a specific one (e.g., air conditioner temperature level) of the controlling values of the specific optional electric load is long clicked, the control unit 401 may set the long-clicked controlling value as a fixed controlling value and display an icon 14-1 indicating the fixed controlling value at the long-clicked position.

Accordingly, the device and method for controlling an electric vehicle according to the fourth of the present invention allow for efficient control of optional electric loads that are set to a fixed value by the user when controlling a predicted distance that the electric vehicle can travel.

As explained above the device and method for controlling an electric vehicle according to embodiments of the present invention enable a user to control a predicted distance that can be travelled by displaying the predicted distance that can be travelled in response to the power consumption of electric loads on the electric vehicle and controlling the turn on/off of optional electric loads while seeing the displayed predicted distance that can be travelled.

The device and method for controlling an electric vehicle according to embodiments of the present invention enable a user to easily increase a predicted distance that can be travelled corresponding to the power consumption of main electric loads on the electric vehicle by deactivating, in order of priority, optional electric loads consuming the amount of power corresponding to an increase in predicted distance that occurs in response to the user's request.

The device and method for controlling an electric vehicle according to embodiments of the present invention can easily and quickly control optional electric loads that consume the amount of power corresponding to a predicted distance that the electric vehicle can travel when controlling the predicted distance.

The device and method for controlling an electric vehicle according to embodiments of the present invention allow for efficient control of optional electric loads that are set to a fixed value by the user when controlling a predicted distance that the electric vehicle can travel.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

The invention claimed is:

1. A device for controlling an electric vehicle comprising:
   a power consumption detector configured to detect a first power consumption of main electric loads associated with the operation of the electric vehicle and a second power consumption of optional electric loads on the electric vehicle;
   a controller configured to determine a first predicted distance that can be travelled corresponding to the first power consumption detected and a second predicted distance that can be travelled corresponding to the second power consumption detected; and
   a display configured to display the first and second predicted distances that can be travelled, wherein the controller changes the displayed predicted distances based on turn-on or turn-off settings of the main electric loads, turn-on or turn-off settings of optional electric loads, priorities of the main electric loads, and priorities of the optional electric loads,
   wherein the controller is configured to:
      display a control window for controlling the optional electric loads on the display when the displayed second predicted distance is selected,
      determine whether a controlling value of a first optional electric load of the optional electric loads is fixed through the control window,
      display, on the control window, an image indicating that the controlling value of the first optional electric load is fixed, if the controlling value of the first optional electric load is fixed through the control window, and
      increase the first predicted distance by a first distance by decreasing the power applied to the optional electric loads other than the first optional electric load such that the fixed controlling value of the first optional electric load is maintained.

2. The device of claim 1, wherein the controller displays a graph of the first and second predicted distances on the display.

3. The device of claim 1, wherein the controller calculates the total distance that can be travelled with a remaining battery capacity by adding the first power consumption A of the main electric loads and the second power consumption B of the optional electric loads, dividing the remaining battery capacity by the added value, and multiplying the divided value by the battery's efficiency (fuel ratio) (km/kw) s of the electric vehicle, determines the first predicted distance that can be travelled by Equation: first predicted distance that can be travelled=total distance that can be travelled s(A/(A+B)), and determines the second predicted distance that can be travelled by Equation: second predicted distance that can be travelled=total distance that can be travelled s(B/(A+B)).

4. The device of claim 1, wherein, when the displayed first predicted distance is extended by a user, the controller deactivates the optional electric loads consuming an amount of power corresponding to the extended distance in order of priority of the optional electric loads.

5. The device of claim 1, wherein, when the controlling value of the first optional electric load is changed through the displayed control window, the controller controls the first optional electric load based on the changed controlling value.

6. A method for controlling an electric vehicle comprising:
   detecting a first power consumption of main electric loads associated with an operation of the electric vehicle and a second power consumption of optional electric loads on the electric vehicle;
   determining a first predicted distance that can be travelled corresponding to the first power consumption detected;
   determining a second predicted distance that can be travelled corresponding to the second power consumption detected;
   displaying the first and second predicted distances that can be travelled on a display; and
   changing the displayed predicted distances based on turn-on or turn-off settings of the main electric loads, turn-on or turn-off settings of optional electric loads, priorities of the main electric loads, and priorities of the optional electric loads, displaying a control window for controlling the optional electric loads on the display when the displayed second predicted distance is selected, determining whether a controlling value of a first optional electric load of the optional electric loads is fixed through the control window;

displaying, on the control window, an image indicating that the controlling value of the first optional electric load is fixed, if the controlling value of the first optional electric load is fixed through the control window; and increasing the first predicted distance by a first distance by decreasing the power applied to the optional electric loads other than the first optional electric load such that the fixed controlling value of the first optional electric load is maintained.

7. The method of claim 6, wherein a graph of the first and second predicted distances is displayed on the display.

8. The method of claim 6, wherein, in the determining of the first and second predicted distances, a total distance that can be travelled with a remaining battery capacity is calculated by adding the first power consumption A of the main electric loads and the second power consumption B of the optional electric loads, dividing the remaining battery capacity by the added value, and multiplying the divided value by the battery's efficiency (fuel ratio) (km/kw) s of the electric vehicle, the first predicted distance that can be travelled is determined by Equation: first predicted distance that can be travelled=total distance that can be travelled s(A/(A+B)), and the second predicted distance that can be travelled is determined by Equation: second predicted distance that can be travelled=total distance that can be travelled s(B/(A+B)).

9. The method of claim 6, further comprising, when the displayed first predicted distance is extended by a user, detecting the optional electric loads consuming an amount of power corresponding to the extended distance in order of priority of the optional electric loads.

10. The method of claim 6, further comprising, when the controlling value of the first optional electric load is changed through the displayed control window, controlling the first optional electric load based on the changed controlling value.

11. The device of claim 2, wherein, when the graph is chosen, the controller displays on the display a first mode for preferentially activating the first optional electric load, among the optional electric loads, to control an inside temperature for the electric vehicle, a second mode for preferentially activating a second optional electric load, among the optional electric loads, to play back multimedia data, and a third mode for activating the optional electric loads in order of priority, and activates or deactivates the optional electric loads according to a mode chosen from among the first to third modes.

12. The device of claim 11, wherein, if the first predicted distance that can be travelled is increased by a first distance by user input, and the first mode is chosen, the controller increases the first predicted distance by the first distance by deactivating the optional electric loads other than the first optional electric load.

13. The device of claim 11, wherein, if the first predicted distance that can be travelled is increased by a first distance by user input, and the second mode is chosen, the controller increases the first predicted distance by the first distance by deactivating the optional electric loads other than the second optional electric load.

14. The device of claim 11, wherein, if the first predicted distance that can be travelled is increased by a first distance by user input, and the third mode is chosen, the controller increases the first predicted distance by the first distance by deactivating the optional electric loads in reverse order of priority.

15. The method of claim 7, further comprising, when the graph is chosen, displaying on the display a first mode for preferentially activating the first optional electric load, among the optional electric loads, to control an inside temperature for the electric vehicle, a second mode for preferentially activating a second optional electric load, among the optional electric loads, to play back multimedia data, and a third mode for activating the optional electric loads in order of priority, and activating or deactivating the optional electric loads according to a mode chosen from among the first to third modes.

16. The method of claim 15, further comprising, if the first predicted distance that can be travelled is increased by a first distance by user input, and the first mode is chosen, increasing the first predicted distance by the first distance by deactivating the optional electric loads other than the first optional electric load.

17. The method of claim 15, further comprising, if the first predicted distance that can be travelled is increased by a first distance by user input, and the second mode is chosen, increasing the first predicted distance by the first distance by deactivating the optional electric loads other than the second optional electric load.

18. The method of claim 15, further comprising, if the first predicted distance that can be travelled is increased by a first distance by user input, and the third mode is chosen, increasing the first predicted distance by the first distance by deactivating the optional electric loads in reverse order of priority.

* * * * *